T. SANDERS & L. C. NICHAOLDS.
HARROW AND CULTIVATOR.

No. 193,999. Patented Aug. 7, 1877.

2 Sheets—Sheet 2.

T. SANDERS & L. C. NICHAOLDS.
HARROW AND CULTIVATOR.

No. 193,999. Patented Aug. 7, 1877.

Witnesses:
P. C. Dietrich
Wm. G. Upperman

Inventors:
Thomas Sanders
Locratus C. Nichaolds
Per C. H. Watson & Co. Attorneys.

UNITED STATES PATENT OFFICE.

THOMAS SANDERS AND LOCRATUS C. NICHAOLDS, OF HAMBURG, IOWA.

IMPROVEMENT IN HARROW AND CULTIVATOR.

Specification forming part of Letters Patent No. 193,999, dated August 7, 1877; application filed June 15, 1877.

*To all whom it may concern:*

Be it known that we, THOMAS SANDERS and LOCRATUS C. NICHAOLDS, of Hamburg, in the county of Fremont and State of Iowa, have invented certain new and useful Improvements in Harrows and Cultivators; and we do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of our invention consists in the construction and arrangement of a combined harrow and corn-cultivator, as will be hereinafter more fully set forth.

Figure 1:
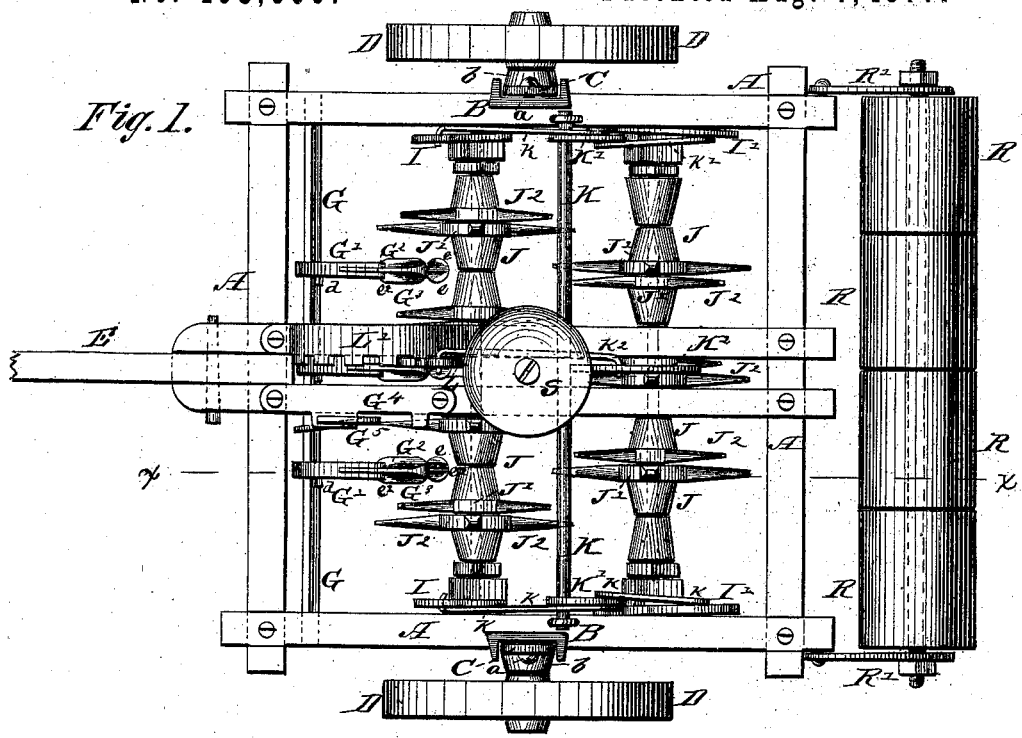
Figure 2:
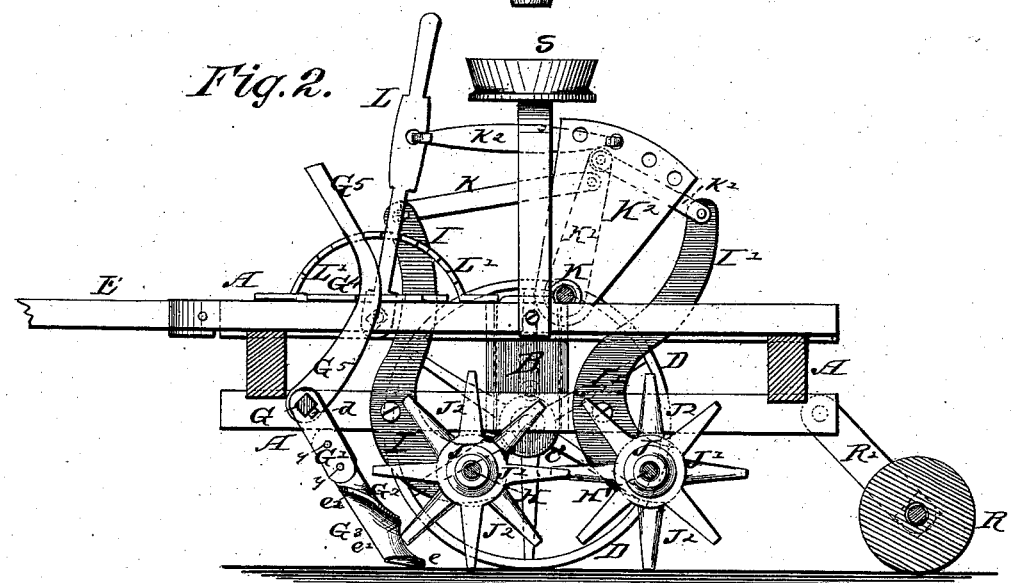
Figure 3:
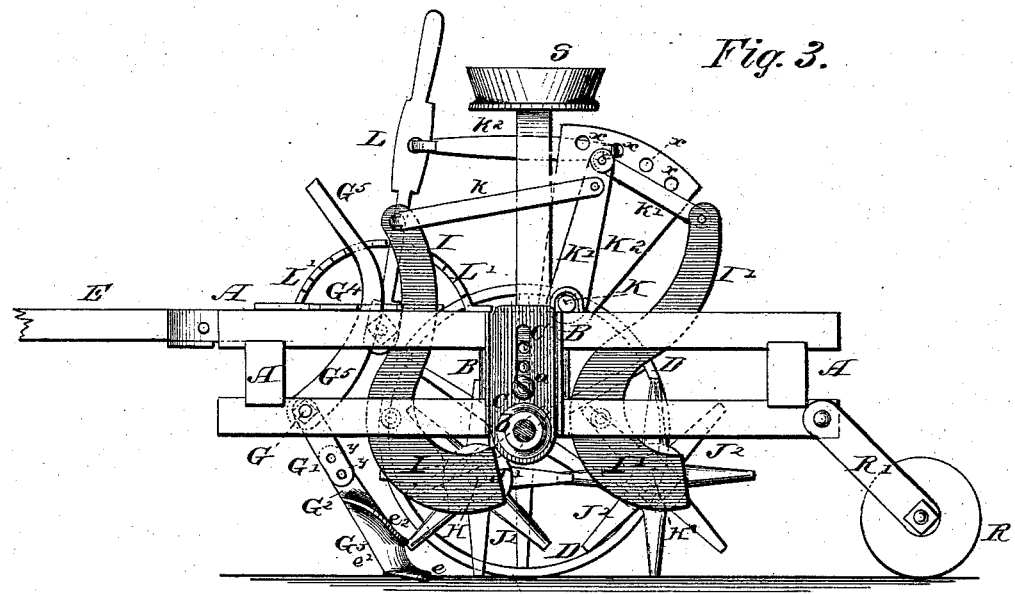
Figure 4:
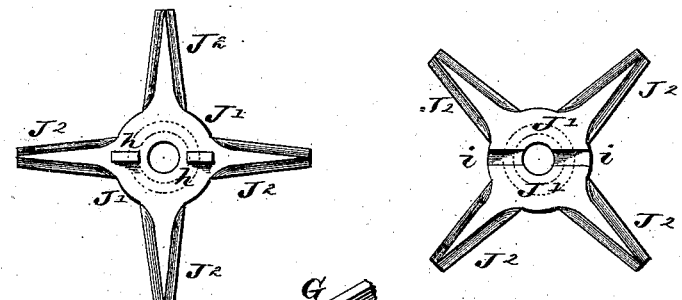
Figure 5:
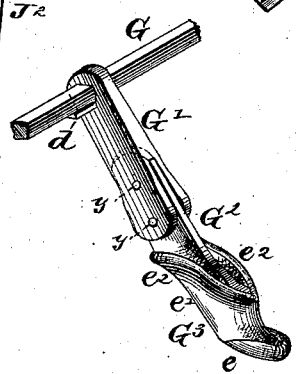

In the annexed drawings, which fully illustrate our invention, Figure 1 is a plan view. Fig. 2 is a vertical section through the line $xx$, Fig. 1. Fig. 3 is a side view, with one of the wheels removed. Fig. 4 is a detailed view of one of the harrow-wheels. Fig. 5 is an enlarged view of the plow.

A represents the frame of our machine, provided at or near the center on each side with a vertically grooved or recessed casting, B, in which is placed a longitudinally-slotted plate, C, adjusted in the casting, and held at any point desired by a set-screw, $a$. From the lower end of the plate C projects a spindle, $b$, on which the wheel D is placed. By these means the frame A may be adjusted up and down on the wheels as may be required, according to the kind of ground on which the harrow is to operate.

E is the tongue, pivoted to the frame in any suitable manner.

In the frame A, near the front end, a shaft, G, has its bearings, the body of said shaft being made square, and provided with a series of adjustable plow-feet, $G^1$, fastened at any point on the shaft by keys $d$, or other suitable and convenient means. Each plow-foot $G^1$ is slotted longitudinally, and in the same is pivoted the shank $G^2$ of the plow $G^3$. This plow is of the peculiar construction shown in the drawing, having its lower end $e$ in the form of a hoof reversed with the heel toward the front. From the center of the hoof $e$, at the front of the plow, extends a cutting-edge, $e^1$, upward for a suitable distance, and from the top of this cutting-edge, on each side of the plow, extends a curved flange, $E^2$, rearward and downward, as shown.

The peculiar construction of these plows causes them to thoroughly and perfectly cover small grain, while the harrow and roller behind them level the furrows.

In rear of the shaft G are two shafts, H H′, having their bearings in the lower ends, respectively, of levers I I and I′ I′, pivoted to the sides of the frame A. These shafts each carry a series of star-wheels, arranged alternately on the two shafts.

These star-wheels are each made in two parts, each part consisting of an elongated hub, J, having at one end a disk, $J^1$, with a series of radial arms, $J^2$, projecting therefrom. When the two parts of the wheel are put together the arms of the two parts should alternate as shown, and the two parts are locked together by one or more lugs, $h$, on one disk, entering one or more corresponding recesses, $i$, on the other disk. By constructing the wheels in this manner of two parts, if any arm should become broken only one half of the wheel need be replaced, instead of the whole wheel, as in other harrows of this class.

The levers I I′, at each side of the machine, are, by rods $k\ k^1$, connected with an arm, $K^1$, projecting from a shaft, K. On this shaft is further secured, at or near the center, an arm or segment, $K^2$, provided with a series of holes, $x$, near its outer end, to be connected by a rod, $k^2$, with a lever, L, pivoted to the frame A, and held at any point desired by a stationary ratchet, L′, as shown. By these means the harrow-wheels are easily raised and lowered as required to work at any depth desired. They can be held to any depth by placing the lever in the proper notch on the ratchet; or by throwing the lever entirely out of the ratchet the wheels are allowed to run by their own weight, and accommodate themselves to the nature of the ground.

In working in trashy ground the front coupling-rods $k\ k$ are unhooked, when the rear shaft H′, with its wheels, may be raised from the ground away from the front harrow, so as to prevent choking and clogging.

R is the roller, hung in arms R' R', pivoted at the rear end of the frame, as shown.

The plow-shaft G is provided with a lever, $G^5$, held in a ratchet-bar, $G^4$, by means of which the plows may be set at any angle desired. The plow-shanks $G^2$ are held in the feet $G^1$ by ordinary break-pins at $y$, to prevent breakage in case of striking obstructions.

S is the driver's seat, arranged so that the driver can easily manipulate both levers $G^5$ and L.

By taking out the center section of the rear harrow and placing one plow on each side of the row of corn in front, a good cultivator for small corn is formed.

Having thus fully described our invention, what we claim as new, and desire to secure by Letters Patent, is—

1. The plow $G^3$, constructed as described, with the reversed hoof $e$, front cutting-edge $e^1$, and curved side flanges $E^2$ $E^2$, substantially as herein set forth.

2. The star-wheel herein described, constructed in two parts, each part consisting of an elongated hub, J, disk $J^1$, and radial arms $J^2$, and the two parts locked together by one or more lugs $h$ and corresponding recesses $i$, substantially as and for the purposes herein set forth.

3. The combination of the two shafts H H', each with a series of star-wheels, as described, the pivoted levers I I', connecting-rods $k$ $k^1$ $k^2$, shaft K with arms $K^1$ $K^2$, and lever L and ratchet L', substantially as and for the purposes herein set forth.

4. The combination of the frame A, adjustable up and down on the wheels D D, the adjustable plows $G^3$, laterally adjustable on the shaft G, the adjustable shafts H H', with bisected star-wheels placed thereon, and the roller R, all constructed substantially as herein set forth.

In testimony that we claim the foregoing as our own we have hereto affixed our signatures in presence of two witnesses.

THOMAS SANDERS.
LOCRATUS C. NICHAOLDS.

Witnesses:
R. K. CRANDAL,
D. G. HINES.